Patented Aug. 9, 1938

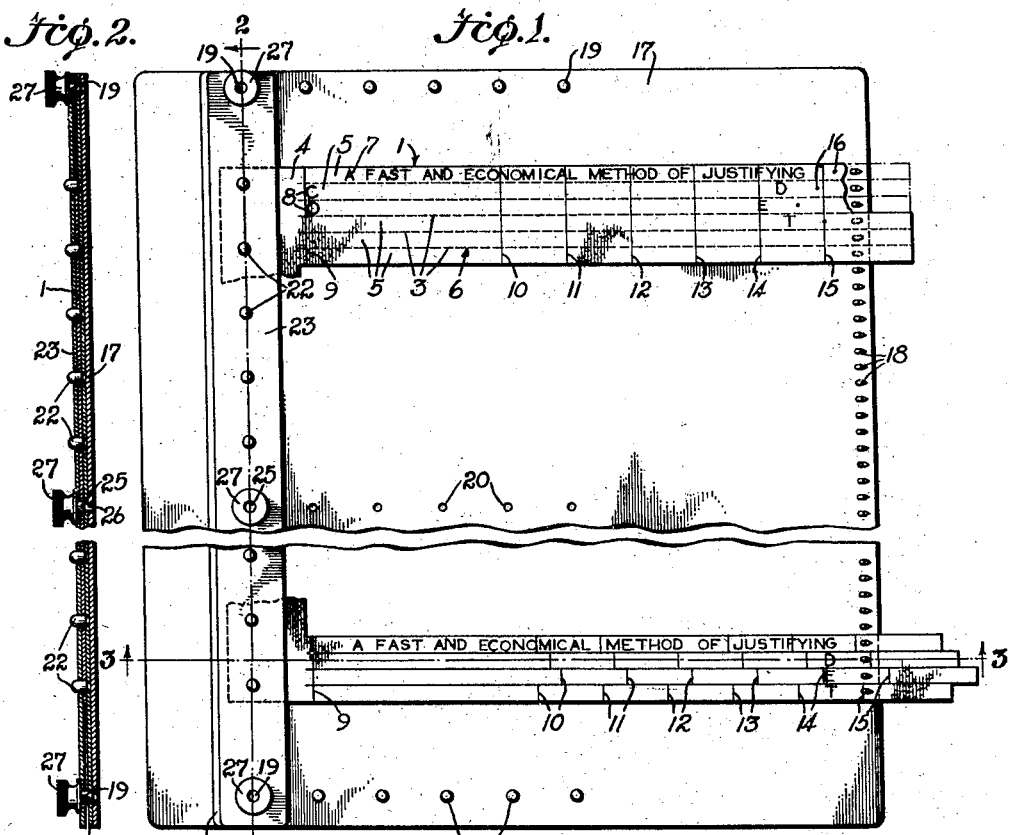

2,126,480

UNITED STATES PATENT OFFICE 2,126,480

CHARACTER ALIGNING SHEET

Harry Landsiedel, Wilton, Conn., assignor to Remington Rand Inc., Buffalo, N. Y.

Application March 17, 1936, Serial No. 69,310

8 Claims. (Cl. 95—4.5)

This invention relates to character or type aligning paper or material adapted to receive printed lines of characters and operable after printing to justify the lines of typing so that the characters at the end of each line are aligned to provide a uniform margin at sides of the sheet.

The invention comprehends the provision of a character aligning sheet formed of a laminated structure provided with a plurality of corrugated sheets of paper integrally joined to form a unitary sheet structure in which the sheet is divided by lines of perforations into a series of adjacent inter-connected strips attached at one end to a marginal portion of the sheet, the connections between the strips being frangible to provide for their ready detachment one from another so they may be subsequently elongated in the operation of aligning the characters typed on the several strips.

The invention also comprehends the use of a laminated sheet formed from sheets of crinkled paper suitably secured together so that the sheet may be formed into a series of strips arranged in parallel relation frangibly connected along their side edges and connected at one end to one margin of the sheet, the strips being independently stretchable relative to one another through the easy breaking of the frangible connections, together with the provision of separate pieces of non-stretchable sheet material attached to the ends of the strips, the margin having a series of perforations and a row of perforations being provided in the end portion of each strip spaced apart a distance equal to the character spacing placed upon the sheet so that the sheet may be placed upon a suitable frame and have the perforations in the margin engaged over dowel pins on one side of said frame with selected holes in the ends of the strips engaged over the dowel pins on the opposite side of the frame in securing alignment of both the left and right hand margins of the typing on the several strips forming the sheet.

In the drawing:

Fig. 1 is a plan view of a sheet made according to this invention, showing a portion having unjustified lines of typing applied to the strip portions of the sheet, the sheet being applied to a holding plate or frame, and another portion of the sheet having the strip portions stretched to justify the lines of typing.

Fig. 2 is a cross section taken on line 2—2 of Fig. 1.

Fig. 3 is a cross section taken on line 3—3 of Fig. 1.

Fig. 4 shows a sheet constructed similar to Fig. 1 with the addition of non-stretchable sections at the ends of the strips illustrating how the sheet is perforated so that the perforations may be used in retaining the strip on a suitable holding frame during the justifying operation.

Fig. 5 shows a fragment of the sheet shown in Fig. 4 applied to a fragment of a supporting frame provided with dowel pins with the sheet having certain of its openings engaged over the dowel pins on the frame and with the strips having typing thereon stretched to justify said lines of typing.

Fig. 6 is a diagrammatic cross section taken on line 6—6 of Fig. 4.

Fig. 7 is a cross section illustrating diagrammatically how the laminated crinkled paper used as part of the present invention may be constructed.

A material for use in making the character or line justifying sheet of the present invention preferably consists of two sheets of what is ordinarily known as crinkled paper. It is preferred to have the crinkled or corrugated paper sheet constructed with the corrugations running in one direction. Two of these sheets are superimposed upon one another and adhesively secured together by a latex compound to form a flexible, stretchable sheet in which the corrugations of both corrugated sheets run in the same direction. This makes the sheet stretchable in the direction opposite to the direction of the corrugations. Sheet material of this character is well known in the art and the illustration in the drawing is for the purpose of showing only sufficient of the structure of the sheet so the present invention may be understood.

The laminated sheet constructed as above described is illustrated particularly in the transverse or lateral cross section of Fig. 7 which shows the structure of the laminated sheet diagrammatically on an enlarged scale, the corrugated or crinkled paper sheets being indicated at 1, while 2 indicates the adhesive latex composition uniting the sheets together to form a composite laminated sheet. The sheet is illustrated in plan view in Fig. 1 and it will be understood that the corrugations extend from the top to the bottom of the sheet so as to provide lateral stretchability.

The sheet is provided with spaced rows of perforations 3 beginning in spaced relation inwardly from the left-hand margin as illustrated in Fig. 1 to leave an integral marginal portion 4. The rows of perforations 3 extend through the opposite side edge of the sheet. These perforations are in the form of elongated slits that extend through both of the corrugated or crinkled paper layers 1 and the latex layer 2 so as to completely sever the sheet into individual strips 5 arranged in adjacent relation in sheet form and held together by the relatively small unperforated and frangible portions 6 of the sheet which are left intact between the ends of the slits or perforations 3. The strips have only a sufficient connection to hold them in sheet form for insertion of the sheet into a typewriter so that the desired information may be typed on the strips, in which one line is placed in the central portion of each strip as illustrated in the drawing, each of the lines having the margin at the left-hand side of the sheet arranged in the usual uniform manner, while the margin at the right-hand side will be non-uniform which is customary with the use of typewriting machines.

In typing on the sheet in the usual way or as shown at the upper portion of Fig. 1, the letter "A" indicated at 7 is indented to begin a paragraph while the first letters in the succeeding lines indicated at 8 will be arranged in vertical alignment. The sheet is preferably printed with faint vertical lines to aid an operator in typing on the sheet so as to produce ultimate justified typing of a desired width between the side margins. For this purpose, line 9 forms the left-hand margin guide line, while lines 10, 11, 12, 13, 14 and 15 form right-hand margin guide lines so the width of the typed matter may be confined within a space of 3, 4, 5, 6, 7 or 8 inches, as may be desired. These printed margin guide lines have a color that will not photograph on the usual photographic film or that may be eliminated by a color screen.

In typing a sheet as above described in accordance with the illustration in Fig. 1, the typewriter used for this purpose will be equipped with a special type bar having a projection similar to that for forming a period, but which is longer than the projection usually used to make a period. This type bar will be so arranged that when the end of the typed line is reached, a special space key may be operated to allow the carriage to move over three spaces, or more or less, as may be desired. The special type bar is then operated by its key with suitable mechanism for moving the ribbon out of the way during its operation so the projection on this special type bar will pierce the central portion of the strip beyond the end of the typed portion to form a pin hole in the sheet indicated by the numeral 16 in Fig. 1. This pin hole is used in justifying the lines of typing in a manner that will be hereinafter described.

If a special spacing mechanism is not available on the typewriter used for the purpose of typing the sheets of this invention, then the operator may use the usual space bar mechanism and at the end of each line of typing provide the requisite number of spaces between the last character in the line of typing before operating the pin hole forming key bar. It will thus be seen that the pin hole formed in each strip of each line will be offset to the same extent as the last character in each line of typing on the sheet, as clearly illustrated in the upper portion of Fig. 1, showing the line of typing on the first or top strip of the sheet and the end characters on several strips below the top one.

After the sheet is completely typed with the desired matter it is then desirable in justifying the lines of typing to mount the sheet on a supporting plate or flange 17. The supporting plate 17 is formed of a flat sheet metal plate of desired size provided with a row of pins 18 on the right hand margin of the plate spaced apart a distance equal to the width of strips 5 so that the central portion of each strip 5 will be aligned with one of the pins 18. These pins are inclined toward the adjacent or right-hand margin of the plate as shown in Figs. 1 and 3.

A row of screw-threaded posts 19 is provided along the upper and lower marginal portions of plate 17. The posts in each row are spaced apart a distance of one inch from center to center to correspond with the spacing of margin guide lines 10, 11, 12, 13, 14 and 15. If it is desirable to space these margin guide lines at some different distance apart then the posts will be correspondingly spaced. The right-hand post 19 at the top and bottom of plate 17 as shown in Fig. 1 will be positioned in vertical alignment and within a vertical plane parallel to the plane of pins 18 and spaced to the left thereof as shown in Fig. 1 a distance sufficient to place margin guide 10 slightly to the left of pins 18. Fig. 1 shows the use of margin guide line 15 with the printing, line 15 being shown to the left of pins 18 in the proper position. As described above the space for each of the right-hand margin guide lines on the sheet has been arbitrarily selected and posts 19 are positioned correspondingly so that for the desired width of printing on the sheet, the sheet will be positioned on the plate with the selected margin guide line at the right in the position of guide line 15 on the plate as shown in Fig. 1. Fig. 1 is on a scale less than actual size.

It will thus be seen that the other posts 19 are spaced different distances from the plane of pins 18 to correspond with the spacing of the margin guide lines on the corrugated justifying sheet so that the sheet may be placed in different positions on plate 17, as desired. The center of plate 17 is formed with a series of apertures 20 that are arranged in spaced relation across the plate corresponding to the spacing of posts 19 with each aperture in the vertical plane intersecting one pair of corresponding posts at the upper and lower margins of plate 17.

A sheet holder has a removable post bar 21 formed of a sheet metal strip provided with a plurality of sheet engaging posts 22. Post bar 21 is provided with openings in the opposite end portions to receive posts 19 as illustrated in Figs. 1 and 2. A sheet clamping bar 23 forms part of the sheet holder and is formed with a laterally extending flange 24 on one edge and a series of openings to receive posts 22 so they may project through bar 23 as illustrated in Fig. 2. Opposite ends of clamping bar 23 are formed with openings to receive posts 19. The central portion of gripper bar 23 is provided with an opening to receive a threaded post 25 mounted in the central portion of post bar 21. A projection 26 extends from the opposite side of the post bar aligned with post 25 as shown in Fig. 2 so that it will freely engage in any one of the openings 20 in plate 17.

Thumb screws 27 are threaded on posts 19 and post 25 having post bar 21 and clamping bar 23 arranged thereon in superimposed relation as shown in Figs. 1, 2 and 3, with a typed sheet for justifying clamped therebetween along the left-hand margin 4. The margin 4 of the sheet provided with the unjustified typing on the strip 5 has a series of holes spaced apart the proper distance to receive posts 22 and post 25 to position the sheet between post bars 21 and clamping bar 23 as shown in Figs. 1 to 3.

With the post bar and the clamping bar retaining the typed sheet therebetween, and the ends engaged over posts 19 at the top and bottom of plate 17, the thumb screws 27 are threaded on posts 19 and posts 25 to lock clamping bar 23 tightly against post bar 21 with the bottom face of post bar 21 clamped tightly against the upper face of plate 17. This position of the parts is shown in Figs. 1 to 3 and projection 26 is engaged in one of the openings 20.

In the illustration of the invention in the Figs. 1 to 3 the line justifying sheet is shown as being provided with typing adapted to have the space between the margins equalling a distance of approximately 8 inches between margins when justified, so that the post bar and clamping bar are placed on the pair of posts 19 nearest to the left-hand edge of plate 17. This positions the right-hand margin of the line justifying sheet so that line 15 is spaced inwardly a slight distance from the plane of pins 18. With the parts in the position as shown in Fig. 1 the sheet is ready to have the lines of typing justified.

For this purpose it is preferred to start with the strip 5 at the top of the sheet. By raising the strip upwardly, and at the same time holding the remaining strips against plate 17, the uppermost strip 5 can be gripped between the fingers of the right-hand for example at the right-hand end as shown in Fig. 1 and in being lifted upwardly the connections 6 between the uppermost strip and the next strip will be broken apart to separate the uppermost strip 5 from the remainder of the sheet except where it is connected to margin 4. As soon as this is done the strip is stretched until pin hole 16 is engaged with the pointed end of pin 18 in alignment therewith. The strip is then forced onto the pin so that pin 18 will project through the pin hole 16. The separated strip 5 when stretched a distance equal to that between the pin hole 16 as shown in Fig. 1 and the pin 18 to the right thereof, will justify the first line of typing. This stretches the entire strip throughout its length and elongates the line of typing on the strip so that the last character in the line will be positioned in alignment with the margin line 15 of the other strips. This justification of the strip is illustrated in the lower portion of Fig. 1 showing four strips at the bottom of the sheet that have been justified by stretching the strips to engage the pin holes over pins 18 thereby producing a uniform right-hand margin for the printed matter on the several strips.

From the illustration in Fig. 1 of the unjustified strip and the ones that have been justified it can be readily seen how each strip upon being separated from the adjacent strip or strips may be stretched to justify the line of typing so that each strip will be stretched a greater or less amount than the adjacent strip to position the pin hole 16 over the corresponding pin 18.

As soon as all of the typed strips on the sheet mounted on plate 17 have been justified in this manner, plate 17 may be placed in a suitable camera for photographing to obtain the desired photographic reproduction of the justified printing or typing. In some cases the justified printing may be photographed directly onto a printing plate that may be treated to subsequently produce printed copies of the justified matter photographed from the sheet on plate 17. Methods and means for utilizing the justified printing produced by this invention to produce printed copies with uniform margins are well known in the art.

The plate 17 may be of any suitable dimension so as to provide for the use of justifying sheets for typing or printing of any character and any size. Where plate 17 is of substantial length a series of openings 20 in the central portion for receiving projection 26 on post bar 21 will facilitate the mounting of the sheet holder in position on plate 17 with the bar clamped only at opposite ends to plate 17 and yet prevent lateral flexing of the sheet holder that might otherwise be caused from the tension placed thereon by the justifying of strips 5 when secured to pins 18. In exceptionally long plates more than one series of holes 20 and projections 26 may be used if desired. Flange 24 as shown in Fig. 3 crimps the sheet around the edge of post bar 21 and in this way provides a more effective clamping of the margin 4 of the sheet between the post bar and the clamping bar and in addition, positions the left-hand portion of the sheet so that the left-hand ends of strips 5 will lie flat upon plate 17.

In Figs. 4, 5, and 6 the line justifying sheet illustrated therein is constructed in the same manner as the one shown in Figs. 1 to 3 and Fig. 7, but arranged so that instead of using a pin hole 16 in the strip for engaging over pins 18 on plate 17, the strips may be pre-punched to eliminate the necessity of having a special key and type bar on the typewriter for punching the pin holes. The line justifying sheet is designated 28, Figs. 4 to 6, and is modified from the construction of the sheet shown in Fig. 1 by the provision of non-stretchable reinforcing strips 29 applied on the under faces of the right-hand end of each of the strips in the sheet. This portion of the sheet is provided with a series of punched apertures 30 spaced apart along each strip a distance equal to the spacing of characters printed on the strip. Since standard spacing is used on most typewriters it will be obvious that these openings 30 may be spaced for typewriters of standard spacing and when used on these typewriters the provision of five holes as shown in Figs. 4 and 5 will allow the stretching of the strips in the sheet an amount sufficient to compensate for five character spaces. This has been found by investigation and experiment to be a sufficient amount of justification to take care of all types of printing or typewriting to secure a justified right-hand margin of the printed matter. The section in Fig. 6 through the ends of the strip showing reinforcing strips 29 applied on the sheet also illustrates the slitted formation of the sheets as described in Fig. 1 through the provision of a series of aligned slits 6, the slits in the illustration in Fig. 6 corresponding to slits 6 in Fig. 1 being illustrated on an enlarged scale and indicated by the numeral 31.

When a sheet 28 is provided with lines of typing as shown in Fig. 4, it may then be applied to a plate 32 constructed in the same manner as the plate 17 with one exception, that is, instead of pins 18 along the right-hand margin of the plate it will be provided with dowel pins 33, that are not pointed, but have rounded ends of a size to project through openings 30. Pins 33 may have the free ends inclined similar to pins 18 or they may be straight if desired. Fig. 5 illustrates the pins as being straight and extending laterally from supporting plate 32. The sheet holder having the post and clamping bar structure for holding the left-hand margin of sheet 28 is constructed in exactly the same manner as disclosed in Fig. 1 and it is therefore not necessary to specifically describe this structure.

When sheet 28 is mounted on supporting plate 32 in the manner of the sheet shown in Fig. 1 and as illustrated in Fig. 5, for justifying the lines of typing, it is only necessary to separate each strip from its adjacent strip or strips and stretch it to engage the desired hole over dowel pin 33. In this manner the lines of typing will have the right-hand margin justified in the same manner as the sheet illustrated and described in Fig. 1 and in view of the foregoing description it will be clearly understood how sheet 28 is justified, particularly in view of the illustration of the sheet in Figs. 4 and 5. In Fig. 5 the strips have been justified and are held in the justified position on supporting plate 32 ready for the photographing operation.

The line justifying sheet after being photographed may be readily removed from plate 17 and stored in a suitable file or disposed in any other manner desired. It will be understood that by using a laminated structure of corrugated sheet, as shown in Fig. 7, and described herein, no further sheet structure is necessary in the provision of a sheet for receiving lines of typing to be justified. The necessity for backing sheets or other associated sheets to the corrugated sheet is eliminated, not only through the use of laminated corrugated paper or similar material, but by reason of the structure of the sheet in the provision of the plurality of strips by providing the strips with connections at spaced intervals through the slitting operation of the sheet in the provision of the strips that receive the lines of typing.

By the use of a laminated sheet formed of a series of corrugated sheets it has been found that a better type of sheet for receiving typing to be justified is provided than through the use of single sheets because the sheet can be more readily handled and provides greater tractability and uniformity in the sheet for the justifying of the typing by stretching the strips.

The invention claimed is:

1. A line justifying sheet comprising a stretchable laminated corrugated sheet of material formed with spaced parallel rows of perforations beginning in spaced relation from one side edge of said sheet and extending through the opposite side edge and providing a plurality of strips having frangible connections at intervals and joined together at one end, said laminated corrugated material providing for elongation of said strips in independent relation, and the maintenance of said strips in elongated form.

2. A line justifying sheet comprising a laminated stretchable sheet formed with weakened portions along a plurality of spaced parallel lines forming said sheet into a plurality of separable independently stretchable strips connected together at one end adjacent one margin of said sheet.

3. As a complete article of manufacture, type aligning paper, comprising two sheets of crepe paper having ridges thereon running in one direction, an adhesive layer joining said sheets together to form a composite laminated sheet, said composite sheet being severed at intervals along spaced parallel lines extending transversely to said ridges in spaced relation inwardly from one edge of said sheet toward and through the opposite edge to form a plurality of separable stretchable parallel strips connected at one end to one margin of said composite sheet.

4. As a complete article of manufacture, type aligning paper comprising two sheets of crepe paper having ridges thereon running in one direction, an adhesive layer joining said sheets together to form a composite stretchable laminated sheet, and means extending transversely to said ridges dividing said sheet into a plurality of separable independently stretchable strips connected to a margin of said sheet at one end.

5. As a complete article of manufacture, type aligning paper comprising a stretchable laminated corrugated sheet of material formed into a plurality of frangibly connected separable strips connected at one end to a margin of said sheet, each of said strips being independently stretchable when separated from adjacent strips, and non-stretchable sections of sheet material mounted on opposite margins of said corrugated sheet at opposite ends of said strips.

6. As a complete article of manufacture, type aligning paper comprising a stretchable laminated corrugated sheet of material formed into a plurality of frangibly connected separable strips connected at one end to a margin of said sheet, each of said strips being independently stretchable when separated from adjacent strips, and non-stretchable sections of sheet material mounted on opposite margins of said corrugated sheet at opposite ends of said strips, said non-stretchable sections having rows of perforations formed therein, a plurality of perforations being formed in aligned relation at one end of each strip spaced apart a distance equal to character spaces of characters printed thereon.

7. A line justifying sheet comprising a stretchable sheet formed to provide a marginal strip on one side and a series of strips extending laterally from said marginal strip in edge to edge relation, and margin guide lines on said sheet extending transversely of said series of strips in spaced parallel relation for defining the side margins of a writing space of predetermined size on said series of strips.

8. A line justifying sheet comprising a stretchable sheet formed to provide a margin on one side and a series of strips extending laterally in edge to edge relation from said margin to the other side, and non-photographing margin guide lines on said sheet extending transversely to said series of strips in spaced parallel relation for defining the side margins of a writing space on said sheet.

HARRY LANDSIEDEL.